Sept. 29, 1936. G. A. MOORE 2,056,053
METHOD OF MAKING HEADLESS SCREWS
Filed June 14, 1934
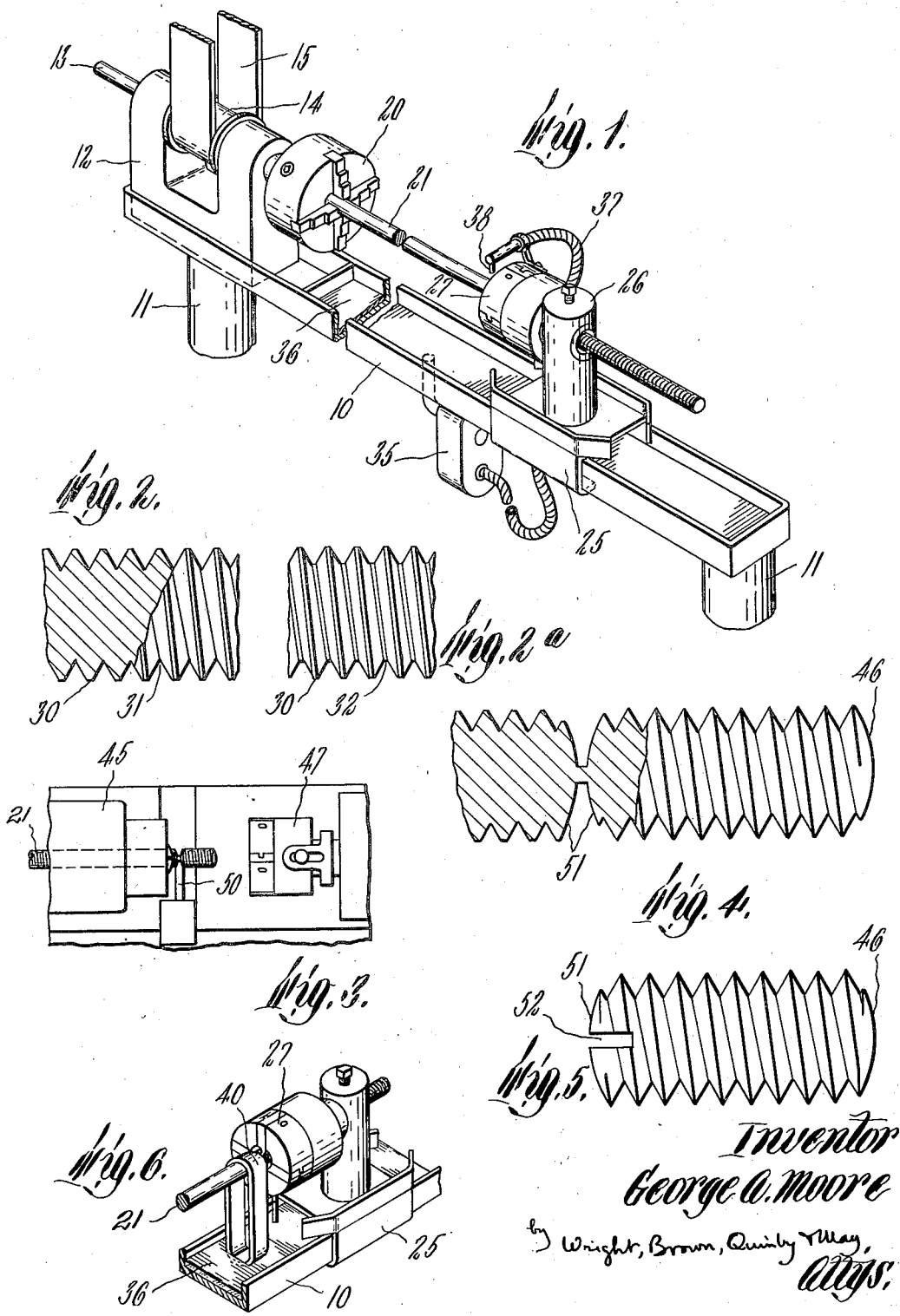
Inventor
George A. Moore
by Wright, Brown, Quinby y May,
attys.

Patented Sept. 29, 1936

2,056,053

UNITED STATES PATENT OFFICE 2,056,053

METHOD OF MAKING HEADLESS SCREWS

George A. Moore, Boston, Mass.

Application June 14, 1934, Serial No. 730,656

3 Claims. (Cl. 10—10)

This invention relates to an improved method of making headless screws, which results in greater speed and economy in production, and to apparatus for use in practicing the method.

Headless screws are customarily made by automatic machinery having a succession of tools which operate successively on rod or wire stock. One tool shapes the end of the stock as desired for the finished screw. Another tool cuts a thread on the end portion of the stock, while a cutting-off tool severs the threaded portion of the stock. The transverse slot to receive the screwdriver may be cut on the same or another machine. According to the practices heretofore obtaining, the automatic machine had to be slowed down during the cutting of the screw since the other operations could not be performed more rapidly. A too rapid cutting of the screw thread makes a rough and uneven thread, and results in excessive wear and tear on the thread-cutting die.

According to the present invention, a screw thread is rough-cut on a long piece of rod or wire stock. This can be conveniently done by securing one end of the stock in a revolving chuck, the opposite end of the stock being in-introduced into a thread-cutting die which is either oversize or has cutting teeth ground down so that the resultant thread is cut to a depth slightly less than its full ultimate depth. This piece of stock is thereupon fed into the automatic machine which can be run at full speed since the thread-cutting die in this machine merely has to complete the cutting of the screw thread by taking out a relatively small chip instead of having to cut the entire thread. By employing the two-step method of cutting the screw thread, a cheaper grade of stock can be used since there is less tendency toward tearing the stock than when the thread is cut in one operation.

For a more complete understanding of the invention, reference may be had to the disclosure thereof which follows and to the illustration thereof on the drawing, of which Figure 1 is a perspective view of apparatus for cutting a thread of partial depth in a long piece of rod or wire stock.

Figure 2 is a fragmentary elevation, partly in section, of the stock after it has been operated upon by the mechanism shown in Figure 1.

Figure 2a is a fragmentary elevation of stock which has been cut by a different form of chaser.

Figure 3 is a fragmentary plan view of a portion of an automatic machine for making headless screws.

Figure 4 is an elevation, partly in section, of the end portion of the piece of stock shown in Figure 3.

Figure 5 is an elevation of a completed headless screw.

Figure 6 is a perspective view of the tool carriage shown in Figure 1, illustrating an improved device for supplying oil for the thread-cutting operation.

Figure 1 illustrates a simple mechanism for cutting the initial helical groove which is later deepened into the form of a finished screw thread. This mechanism may, as shown in Figure 1, comprise an elongated trough 10 on suitable supports 11. At one end of the trough is mounted a yoke 12 having a shaft 13 journaled therein. A pulley 14 on this shaft is driven as by a belt 15 from any suitable source of power. Mounted on the shaft 13 is a chuck 20 which may be of any convenient construction and which is adapted to grip an end of an elongated piece of rod or wire stock 21. Slidably mounted on the top of the trough 10 is a carriage 25 on which is mounted a supporting standard 26 carrying a thread-cutting die 27. The die is slightly oversize, or the thread-cutting teeth of the chasers are sufficiently relieved so that the thread cut on the stock 21 is not quite cut to its full depth. As a result, an oversize die will ordinarily leave a narrow helical strip 30 of original surface on the stock as a flat crest between the valleys 31 of the thread cut by the die 27, as indicated in Figure 2. If the ends of the chaser teeth are ground off, a flat bottom 32 will be left in the valley 31. If desired, I may use a standard sized die to cut a thread on a slightly undersized piece of stock. This will result in a thread having a flat crest 30 but a standard minor diameter. As the chuck and stock 21 are rotated by the power belt 15, the die 27 feeds itself along the stock as it rough-cuts the thread thereon. In order to lubricate the thread-cutting chasers, an oil pump 35 may be provided to receive oil from a pool 36 within the trough 10 and to pump it through a flexible hose 37 to a spout 38 which is in a suitable position to discharge the stream of lubricant on the stock at the point of cutting. Lubrication of the chasers may also be accomplished by a simpler device, as illustrated in Figure 6. As shown, I may hang an endless flexible belt 40, on the stock piece 10 before the thread-cutting operation is started. The belt 40 is of sufficient length to dip into the pool of lubricant liquid 36 in the trough 10. As the stock is rotated by the chuck 20, the belt 40 runs thereon, picking up a film of lubricant from the pool 36 and depositing the lubricant on the stock 10 adjacent to the point of cutting. As the die 27, with its carriage 25, travels along the top of the trough 10, it pushes the belt 40 ahead of it.

Figure 3 shows a plan view of a portion of an automatic machine such as a turret lathe, for forming the individual screws. The automatic machine includes a suitable chuck indicated at 45, which grips the stock piece 10 and presents an end portion thereof for operation thereon by successive tools of the automatic machine. The latter may include a tool for suitably shaping the end of each screw. In Figures 4 and 5, the screws are shown as finished with a spherical end face 46, but it is evident that a conical, cupped or other form of end may be produced by suitable tools. A thread-cutting die 47 may then be brought into operative relation with the projecting end portion of the work by the chuck 45. This die finishes the cutting of the thread so that the full depth of the thread is obtained as indicated in Figures 4 and 5. Owing to the fact that most of the removal of material necessitated by the cutting of the thread has already been accomplished by the rough cut made by the die 27, the finishing cut by the die 47 may be carried out at comparatively high speed so that the automatic machine need not be slowed down for this operation. This not only speeds up the production rate, but also saves wear and tear on the speed-changing mechanism of the automatic machine. In case slightly undersized stock is employed and a thread of standard minor diameter is cut thereon prior to the introduction of the stock into the automatic machine, a second thread-cutting step is unnecessary except to smooth down or remove possible burrs. After the finishing cut of the screw thread has been completed by the die 47, the screw is cut off from the stock piece as by a suitable tool 50. This tool may be shaped so as to leave the cut ends with a rounded shape as shown at 51 in Figures 4 and 5. Thereafter, a head slot 52 may be cut in the severed screw by suitable apparatus.

It is evident that various modifications and changes may be made in the particular method hereinbefore described, without departing from the spirit or scope of the invention as defined in the following claims.

I claim:—

1. A method of making headless screws, which comprises rough-cutting a screw thread on substantially the entire length of a long piece of stock, shaping an end of said stock, finish-cutting the thread on a predetermined portion of the stock adjacent to the shaped end, cutting off said finished portion, and repeating in rotation the end-shaping, thread-finishing and cutting-off operations on said stock, the thread-finishing operation being carried on at a greater speed than the rough-cutting operation.

2. A method of making headless screws, which comprises rough-cutting a screw thread on substantially the entire length of a long piece of stock, and thereafter alternately making a finishing cut on the screw thread of successive end portions of said stock and cutting off said end portions, the speed of the rough-cutting step being independent of the speed of the thread-finishing cut.

3. A method of making headless screws, which comprises rough-cutting a screw thread on substantially the entire length of a long piece of stock, shaping an end of said piece of stock, finishing the thread on a portion of said stock by a finishing cut beginning at the shaped end, cutting off said portion of the stock having a finished thread, and repeating in rotation the steps of end-shaping, finish-cutting portions of the thread and cutting off the portions with finished thread, the speed of said rough-cutting operation being independent of the other said operations.

GEORGE A. MOORE.